United States Patent
Kamanina (10) Patent No.: US 7,482,043 B2
(45) Date of Patent: Jan. 27, 2009

(54) FULLERENE-DOPED NEMATIC LIQUID CRYSTAL COMPLEX WITH HIGH-SPEED ELECTROOPTIC RESPONSE AND LIQUID CRYSTAL DEVICE BASED ON IT

(75) Inventor: Natalia Vladimirovna Kamanina, Novatorov Boulevard, 57-1-185, 198216, St.-Petersburg (RU)

(73) Assignees: Samsung Electronics Co., Ltd, Gyeonggi-do (KR); Natalia Vladimirovna Kamanina, St. Petersburg (RU)

( * ) Notice: Subject to any disclaimer, the term of this patent is extended or adjusted under 35 U.S.C. 154(b) by 190 days.

(21) Appl. No.: 11/538,997

(22) Filed: Oct. 5, 2006

(65) Prior Publication Data

US 2007/0262287 A1 Nov. 15, 2007

(30) Foreign Application Priority Data

Mar. 23, 2006 (RU) ............................. 2006109195

(51) Int. Cl.
C09K 19/52 (2006.01)
C09K 19/58 (2006.01)

(52) U.S. Cl. .................... 428/1.1; 428/1.3; 252/299.01; 252/299.2; 252/299.3

(58) Field of Classification Search .................. 428/1.1, 428/1.3; 252/299.01, 299.2, 299.5, 299.3
See application file for complete search history.

(56) References Cited

U.S. PATENT DOCUMENTS 5,552,915 A * 9/1996 Khoo .......................... 349/200
5,589,101 A * 12/1996 Khoo ..................... 252/299.01
2005/0062927 A1 3/2005 Nakamura et al.

OTHER PUBLICATIONS

G. Cipparrone et al., "Orientational Gratings in Dye-Doped Polymer-Dispersed Liquid Crystals Induced by the Photorefractive Effect," Optic Letters, Oct. 1, 1998, vol. 23, No. 19, pp. 1505-1507.
N.V. Kamanina et al., "The Effect of Fullerenes on the Dynamic Characteristics of Liquid Crystal Systems," Technical Physics Letters, 2000, vol. 26, No. 10, pp. 864-866.
N.V. Kamanina, "Fullerene-dispersed Nematic Liquid Crystal Structures: Dynamic Characteristics and Self-Organization Process," Physics-Uspekhi 48, 2005, pp. 419-427.
N.V. Kamanina et al., "LC SLM Based Fullerene Doped Polymide," Nolinear Optics, 2000, vol. 25, pp. 207-212.

(Continued)

Primary Examiner—Shean C Wu
(74) Attorney, Agent, or Firm—MacPherson Kwok Chen & Heid LLP (57) ABSTRACT

The present disclosure describes liquid crystal materials comprising a nematic liquid crystal composition and fullerene-containing complex with high-speed electro-optical response. The fullerene-containing complex includes an organic donor and fullerene, where organic donor represents the electro-optical molecule with initial internal donor-acceptor interaction. The present disclosure also includes liquid crystal devices based on the composition mentioned above. The systems and techniques described herein provide a nematic liquid crystal structure sensitized with a fullerene-containing complex. The material provides improved temporal parameters of the NLC electro-optic response under conditions that maintain good contrast of liquid crystal display devices.

12 Claims, 4 Drawing Sheets

OTHER PUBLICATIONS

N.V. Kamanina et al., "Mechanisms of Optical Limiting in Fullerene-Doped π-Conjugated Organic Structures and Demonstrated with Polymide and COANP Molecules," Optics and Spectroscopy, 2002, vol. 93, pp. 408-415.

N.V. Kamanina et al., "The New Internal Orienting Substituent Effect-Significant Acceleration of the Rotational Rate of the Molecules of a Liquid Crystal When Fullerene-Containing Complexes are Introduced Into It," J. Opt. Technol. 71, Mar. 2004, pp. 187-191.

N.V. Kamanina, "Optical Investigations of a $C_{70}$ -doped 2-cyclooctylamino-5-nitropyridine-liquid Crystal System," Journal of Optica A: Pure and Applied Optics, 2002, pp. 571-574.

N.V. Kamanina, "Optical Limiters and Diffraction Elements Based on COANP-Fullerene System: Nonlinear Optical Properties and Quantum-Chemical Simulation," Optics and Spectrometry, 2004, vol. 96, No. 4, pp. 659-673.

N.V. Kamanina et al., "Study of the Time Parameters of Fullerene-Containing Nematic Liquid-Crystal Cells: A nematic-smetic Transition Simulated by a Complex-Formation Process," J. Opt Technol. 71, May 2004, pp. 327-329.

N.V. Kamanina, "Switching of Optical Response in Fullerene-Doped Liquid Crystal Compounds," Optics Communications 235, 2004, pp. 361-364.

N.V. Kamanina et al., "Variation of the Orientational Order Parameter in a Nematic Liquid Crystal-COANP-$C_{70}$ Composite Structure," Technical Physics Letters, vol. 31, No. 6, 2005, pp. 478-480.

L.P. Rakcheeva, "Prospects of the Use of Fullerenes for the Orientation of Liquid-Crystalline Compositions," Technical Physics Letters, vol. 28, No. 6, 2002, pp. 457-460.

\* cited by examiner

FULLERENE-DOPED NEMATIC LIQUID CRYSTAL COMPLEX WITH HIGH-SPEED ELECTROOPTIC RESPONSE AND LIQUID CRYSTAL DEVICE BASED ON IT

CROSS REFERENCE TO RELATED APPLICATIONS

This application claims priority to Russian Patent Application No. RU2006109195, filed on Mar. 23, 2006, which is hereby incorporated by reference in its entirety.

BACKGROUND

1. Technical Field

The current disclosure relates to liquid crystal systems that may be used in liquid crystal display elements. In particular, the disclosure relates to compositions including fullerene-containing complex nematic liquid crystal materials with high-speed electro-optical response, and liquid crystal devices using the disclosed composition.

2. Description of Related Art

Spatial light modulators (SLMs) with liquid crystal (LC) layers have been intensively investigated and improved over the last decade. The interest in these modulators used as liquid crystal display (LCD) elements arises from their beneficial characteristics, such as low operating voltage, good threshold characteristics, high uniformity, as well as enhanced gray-scale, resolution, and speed characteristics.

Among different types of LC SLMs, study and development of dispersed liquid crystals (DLCs) hold great promise, because they combine the properties of photosensitive components with electro-optical parameters of LCs. Moreover, LC orients suspended particles within to act as molecular matrices which are easily controlled by external electric or light fields. The particles become sensitive to driving voltage and, as a result, the speed of liquid-crystal matrix orientation changes.

It should be noted that the electro-optical response speed is a very important characteristic of liquid crystal devices, since it influences the speed and correctness of the transformation of information processing. Different techniques may be used to enhance the speed of the electro-optical response. In addition to changing geometric dimensions of the structure and characteristics of the supply voltage, the physical-chemical properties of nematic liquid crystal materials (nematic LC) may be modified.

In particular, photosensitive substances (e.g. dyes) are being introduced into nematic LC materials. Introduction of these substances results in the increase of compound absorption and photoconductivity. In this case, the photorefractive effect is observed, resulting in an efficient modulation of a laser beam transmitted through LC sensitized with the dye, as outlined in Cipparrone, G.; Mazzulla, A.; Simoni, F. "Orientational gratings in dye-doped polymer-dispersed liquid crystals induced by the photorefractive effect", *Optics Letters*, vol. 23, no.19, pp. 1505-7 (1998), (referred to as "Mazzulla" herein). Based on the effect indicated in Mazulla, switching times close to 5 ms have been observed. The defects of DLCs with dyes are poor light stability and inadequate speed.

A new technique uses NLCs sensitized with fullerenes to improve the nematic LC time-on and time-off characteristics of the electro-optical response. The experimental investigation of this method, the start of the model to reorient the LC-dipoles, and the influences of the boundary conditions are shown in some of the current inventor's papers; for example, in N. V. Kamanina, L. N. Kaporskii, "The effect of fullerenes on the dynamic characteristics of liquid crystal systems", *Tech. Phys. Lett.* v. 26, no. 10, pp. 864-866 (2000), N. V. Kamanina, N. A. Vasilenko, "LC SLM based on fullerene doped polyimide", *Nonlinear Optics*, v. 25, pp. 207-212 (2000), L. P. Rakcheeva, N. V. Kamanina, "Prospects of the use of fullerenes for the orientation of liquid-crystalline compositions", *Tech. Phys. Lett.*, v. 28, no.6, pp. 457-460 (2002), and N. V. Kamanina, "Optical investigations of a $C_{70}$-doped 2-cyclooctylamino-5-nitropyridine-liquid crystal system", *J. Optics A: Pure and Applied Optics*, v. 4, no. 4, pp. 571-574 (2002) (referred to herein as "Kamanina 2002").

The systems contained three components: LC, sensitizer, and plasticizer. The mechanism used to orient LC dipoles involves creation of the wall from fullerene and fullerene-complex. This mechanism can be useful in orienting LC molecules, and can be easily formed and controlled under external action. In particular, it may be controlled using an electric field or light irradiation.

Switching times of less than 1 ms have been measured. The influence of the interface condition on dynamic characteristics of the LC mesophase, the nature of the alignment layer, and the affect of the applied voltage has been studied.

Moreover, it had been mentioned in Kamanina 2002 that the new technique for improving the switching parameters of the NLC electro-optical response could be useful in developing new LC displays. The enhanced local polarizability of a unit volume of media based on charge-transfer complex: pyridine group molecule-fullerene, introduced in NLC, has been calculated. However, a drawback of this technique is that the use of plasticizer as an additional component decreased the speed.

Further, in N. V. Kamanina and A. I. Plekhanov, "Mechanisms of optical limiting in fullerene-doped π-conjugated organic structures demonstrated with polyimide and COANP molecules", *Optics and Spectroscopy*, v. 93, no. 3, pp. 408-415 (2002) and N. V. Kamanina, E. F. Sheka, "Optical limiters and diffraction elements based on a COANP-fullerene system: Nonlinear optical properties and quantum-chemical simulation", *Optics and Spectroscopy*, v. 96, no. 4, pp. 599-612 (2004), evidence of charge transfer complex formation and the influence of this process on the absorption, nonlinear, and dynamic properties of pyridine and polyimide molecules was noted.

Additionally, some steps had been devoted to the study of charge transfer complex of different organic structures, and some work had been done showing the influence of charge transfer complex on the speed of NLCs. These steps are outlined in N. V. Kamanina, D. A. Moskovskikh, I. Yu. Denisyuk, M. M. Mikhailova, S. V. Butyanov, V. G. Pogareva, A. V. Mezenov, Yu. A. Zubtsova, V. A. Shulev, and I. Yu. Sapurina "The new internal orienting substituent effect-significant acceleration of the rotational rate of the molecules of a liquid crystal when fullerene-containing complexes are introduced into it", *Journal of Optical Technology*, v. 71, no. 3, pp. 187-191 (2004), N. V. Kamanina, I. Y. Denisyuk, "Switching of optical response in fullerene-doped liquid crystal compounds", *Optics Communications*, v. 235, nos. 4-6, pp. 361-364 (2004), and N. V. Kamanina, I. Yu. Denisyuk, M. M. Mikhailova, I. Yu. Sapurina, "Study of the time parameters of fullerene-containing nematic liquid-crystal cells: a nematic-smectic transition stimulated by a complex-formation process", *Journal of Optical Technology*, v. 71, no. 5, pp. 327-329 (2004). Switching times of 200-500 microseconds have been measured.

It has been shown that the charge-transfer complexes between an organic donor and fullerenes drastically influences the dynamic properties of LCs with pyridine, polyaniline, phthalocyanine, etc. The new complex has a large dipole moment and hence the polarizability of the compound is increased. This effect improves the control of the nematic LC structure with high speed.

It is noted that previously, smectic ferroelectric liquid crystal structures have been used to improve the speed of LC-displays. However, alignment problems with smectic LC layers have been observed. Moreover, until now, smectic LC structures have been very expensive. The problems mentioned above affect the industrial application and development of ferroelectric LCDs.

SUMMARY

Systems and techniques described herein may provide for relatively low-priced liquid crystal material compositions with improved characteristics, in particular, with higher speed (switching parameters) LCD-elements, in which compounds mentioned above are used.

The systems and techniques employ liquid crystal compositions including nematic liquid crystal molecules with a fullerene-containing charge transfer complex between an organic electro-optical molecule donor and fullerene.

Generally, the fullerene-containing complex may include the donor part of a monomer or polymer organic electro-optical molecule based on an initial donor-acceptor interaction.

The complex mentioned above can be included in a liquid crystal composition in amount of less than 1 wt. % of the composite mass of the liquid crystal composition.

Thus, based on the present disclosure, the proposed liquid crystal composition includes liquid crystal materials with molecules of nematic liquid crystal mixture and fullerene-containing complex with an electro-optical organic donor and fullerene.

Additionally, in embodiments of the present invention, a liquid crystal device comprises two substrates coated with electrode materials and having the above liquid crystal material composition between them, where the liquid crystal material includes one or more liquid crystal materials and a fullerene-containing complex.

In accordance with some embodiments of the current invention, a substantial improvement in switching parameters of the electro-optical response of NLC material sensitized with fullerenes is obtained. For example, the response may be improved by two orders of magnitude.

Other benefits that may be obtained with use of this disclosure, include use of the techniques with a broad class of organic electro-optical donors, because the nature of the organic donor can be further eliminated in the charge transfer complex between an organic donor and a fullerene molecule.

An additional benefit of the current disclosure is that, to achieve the effect mentioned above when a fullerene-containing complex is used, it is sufficient to include only small amount of this complex, such as less than 1 wt. % (e.g., 0.1-1 wt. %).

The current systems and techniques can be used to obtain high-speed parameters of a liquid crystal display using nematic LC-mixtures (for example, commercial mixtures), which are generally cheaper than the smectic LC-materials. This provides lower cost liquid crystal devices with enhanced performance.

DETAILED DESCRIPTION

It has been shown that a fullerene-containing complex initiates effect on the dynamic properties of the LC, and changes the order parameter of the system. The change in the order parameter has been demonstrated using NMR (Nuclear Magnetic Resonance) methods, and has been reported in N. V. Kamanina, A. V. Komolkin, N. P. Yevlampieva "Variation of the orientational order parameter in a nematic liquid crystal-COANP-$C_{70}$ composite structure", *Tech. Phys. Lett.* 31, No. 6, 478-480 (2005). A review of the dynamic and physical properties of a fullerene-doped LC mesophase, the development of the model, and discussion of dominant factors for the increase in NLC speed with the introduction of a fullerene-containing complex has been presented in N. V. Kamanina, "Fullerene-dispersed liquid crystal structure: dynamic characteristics and self-organization processes" *Physics-Uspekhi* 48 (4), 419-427 (2005).

However, the publications listed above do not resolve the correlation problem for obtaining high response speed while retaining adequate contrast. Moreover, the optimal concentration range of the sensitizer, the optimal component formation techniques, and basic requirements for choosing the donor-acceptor molecule had not been founded.

Published US patent application 2005/0062927, published on Mar. 24, 2005 describes LC-devices containing liquid crystal layer placed between two substrates coated with conductive material forming conducting electrodes.

In this device, the LC layer consists of liquid crystal materials containing LC molecules and dispersed particles with diameters up to 0.2 microns. The introduction of these particles as sensitizers may make it possible to form an LC-layer in a stable transparent state. Such an implementation should improve the characteristics of LC-devices; in particular, the viewing angle, contrast, and switching speed.

As one alternative, US patent application 2005/0062927 discloses that the thin dispersed particles may be fullerenes. However, in the above-referenced patent application, there are no disclosure of a fullerene-containing complex using an organic donor and fullerene. Additionally, it should be noted that the disclosed sensitizer component concentration range is relatively large; namely from 1 to 20 wt. %. Such a large concentration may increase the price of resulting LC-devices while decreasing the contrast of the NLC composite.

Compositions in accordance with the current disclosure include liquid crystal materials containing molecules of liquid crystal and a fullerene-containing complex, where the fullerene-containing complex includes an organic electro-optical donor and fullerene.

The nematic liquid crystal materials used herein are not limited to particular materials. For example, the nematic liquid crystal materials may include one or more NLC materials used traditionally in liquid crystal displays.

Suitable NLCs can be NLC materials including a cyanobiphenyl group with positive optical and dielectric anisotropy (i.e. $\Delta n > 0$ and $\Delta \in > 0$). In particular, nematic LC materials and mixtures such as 5CB (E. Merck) or E7 (BDH), as well as Russian NLC compositions such as ZhK-1282, ZhK-1289 can be used.

In accordance with current disclosure, the fullerene-containing complex includes a relatively small amount of the organic electro-optical donor material and fullerene components.

The fullerene can be presented as fullerene $C_{60}$, $C_{70}$, and higher fullerenes, and preferably includes anisotropic fullerenes such as $C_{70}$.

The organic donor appears in the organic electro-optical molecule with the initial donor-acceptor interaction. Preferably, the electron affinity energy of the acceptor part of the organic molecule should be less than the electron affinity energy of the fullerene.

Monomer or polymer organic molecules may be used for the organic donor. In accordance with current disclosure, the organic donor may comprise one or more materials such as pyridine, polyaniline, phthalocyanine, polyimide, prolinol, etc. Preferably, in accordance with the current disclosure, the best organic donor materials are: pyridines, polyanilines and polyimides.

In accordance with the current disclosure the organic electro-optical donor and fullerenes form the fullerene-containing complex by charge transfer. This complex can be obtained from solution by dilution with water or from dry mixture by dispersing.

In accordance with the current disclosure, the complex obtained should be introduced in NLC-materials (in LC mesophase) with the composition described herein.

To achieve the aims of current disclosure and to obtain the desired technical effect, the fullerene-containing complex may be a relatively small percentage of the composition; for example, an adequate amount of the fullerene-containing complex in the composition is less than 1 wt. %. Generally, the complex concentration is included in the range from about 0.1 wt. % to about 1 wt. %. Preferably, in accordance with the current disclosure, if the organic electro-optical donor is part of a monomer organic electro-optical molecule, the content of fullerene should be in the range from about 0.5 wt. % to about 1 wt. %. If the organic electro-optical donor is part of a polymer organic electro-optical molecule, the content of fullerene should be in the range from about 0.1 wt. % to about 0.5 wt. %.

It should be mentioned that the indicated concentration range, namely 0.1-1 wt. %, is essentially less than the ranges shown in published United States Patent Application 2005/0062927, Masako Nakamura, Yoshito Hashimoto, Tokihito Shinomiya, Shigeaki Mizushima: Liquid crystal display device, published on Mar. 24, 2005, which includes 1-20 wt. % of sensitizer.

Moreover, it had been established by the current inventor, that increasing the concentration to a level higher than the range disclosed above should not lead to increased speed. Moreover, when the concentration exceeds the range mentioned above, the contrast decreases drastically, as described below.

In order to obtain high-speed switching, the fullerene-containing complex is included in a nematic LC mesophase. The switching speed is improved due to introduction of the fullerene-containing complex with charge transfer. The incorporated fullerene-containing complex stimulates the self-arrangement of the NLC, creates the enhanced dipole moment, and enhances the polarizability.

As a result, NLC structures may be controlled simply, using electric and/or light interaction. Additionally, the re-orientation of LC dipoles from a state with maximum birefringence to a state with minimum birefringence may be carried out with high speed.

Using presented theoretical explanations, the current inventor notes that from a chemical point of view, the fullerene introduction provokes the transition from neutral fullerene molecules to their ion-radical forms. From a physical point of view, the dipole moment and polarizability of the systems can be changed drastically, which may lead to the easy operation of display devices with the new composite using electric and/or light fields, with high-speed NLC switching.

As noted above, the complex between the organic donor and the fullerene has a high dipole moment, and hence it increases both the local polarizability and macropolarizability of the new NLC-composite. Moreover, the molecular mass of the organic components incorporated in the composite, and the cell thickness are small enough that they can be considered negligible. The new fullerene-containing complex induces self-arrangement of the LC compounds with increased order parameters and creates network structures, which can be useful for causing high-speed re-orientation of the anisotropic LC molecules and consequently high-speed optical response. A general view and illustration of the mechanism to re-orientate the LC molecules via the introduction of the fullerene-containing complex is shown in FIGS. 1A to 1C.

Figure 1A:
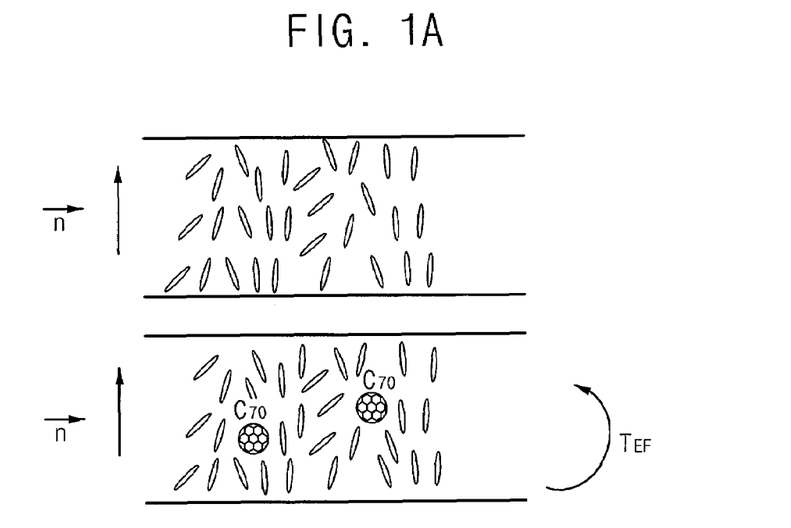
FIGS. 1A to 1C illustrate a general view of and mechanism for the LC molecule reorientation under the influence of a fullerene-containing charge transfer complex.
Figure 1B:
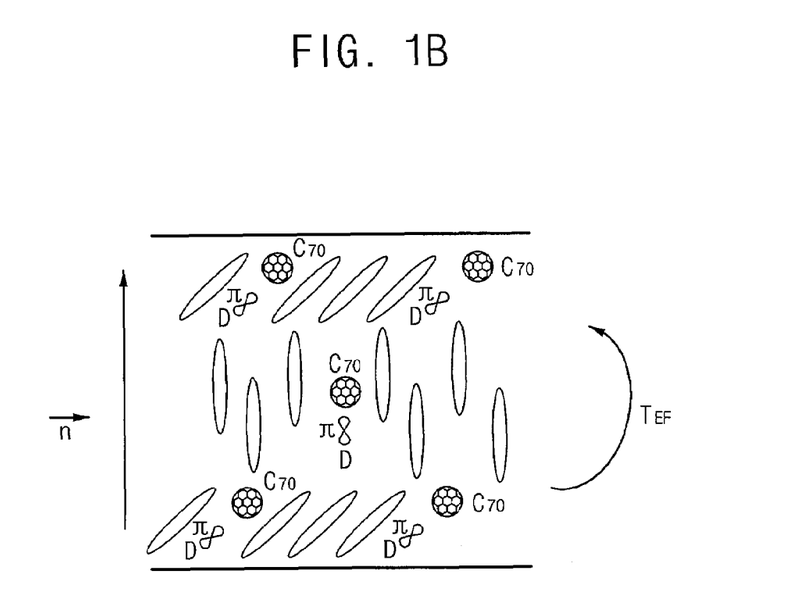
Figure 1C:
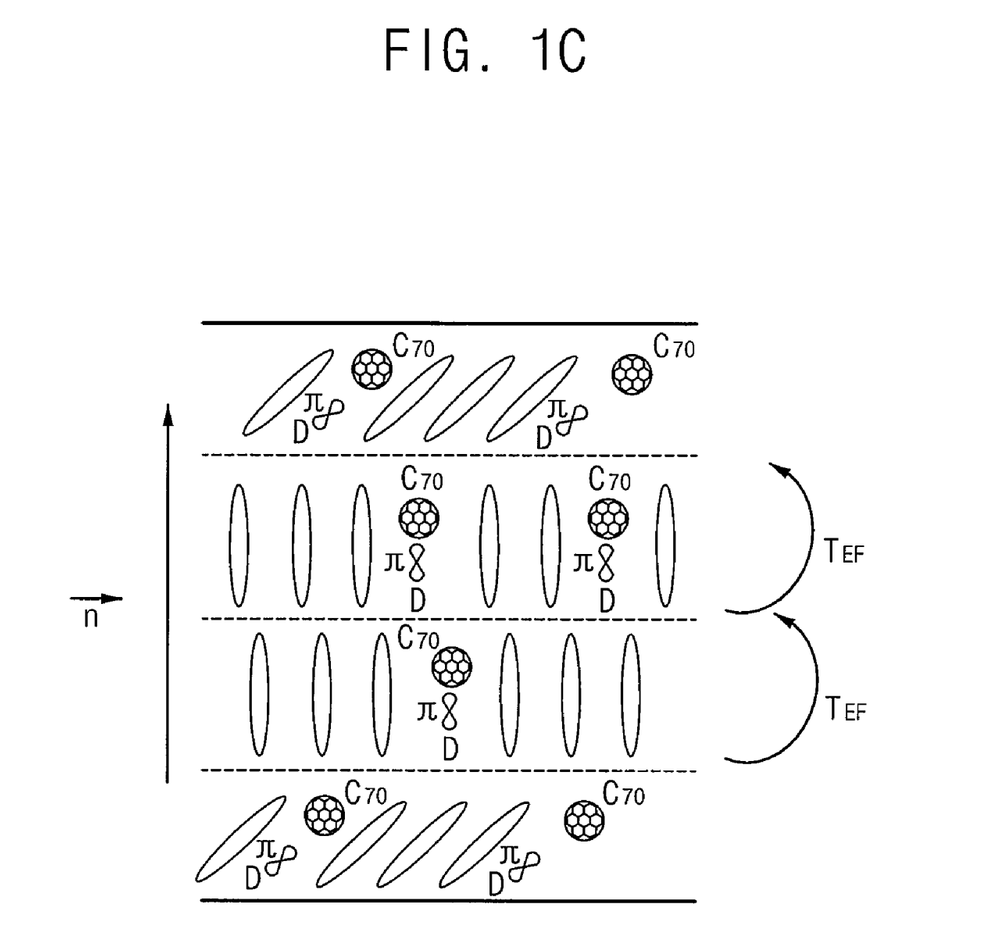

FIG. 1A illustrates a nematic LC mesophase with fullerene-wall to orient LC dipoles. FIG. 1B illustrates the fullerene-containing complex, which influences the re-orientation of the LC molecules before self-arrangement processes in the LC mesophase. FIG. 1C illustrates the fullerene-containing complex, which influences the re-orientation of the LC molecules after self-arrangement processes in the LC mesophase. In the case illustrated in FIG. 1C, a new composite similar to a smectic composite is shown. The new complex allows control of all mesophase (via both local polarizability and macropolarizability of the structure) to be synchronized. In FIGS. 1A to 1C, n denotes the primary direction of the LC director (e.g., electric field), $t_{ef}$ denotes the effective switching time, and D denotes the donor part of the organic molecules that can be used to create the complex between the fullerene and organic molecules.

The improved time response of an LCD including the fullerene-containing complex may be illustrated with the following example. The time-on of the electro-optical response falls in the range of 40-100 ms for typical nematic liquid crystals with thicknesses of 10-50 micrometers. As published on the Internet, Samsung has shown switching times in the range of 4-8 ms for nematic LC materials with thicknesses of 3-4 micrometers. In accordance with embodiments of the current invention, after the self-arrangement in the fullerene-doped structure, the time-on of the electro-optical response can be measured as 100-300 microseconds; that is, two orders of magnitude shorter.

Figure 2:
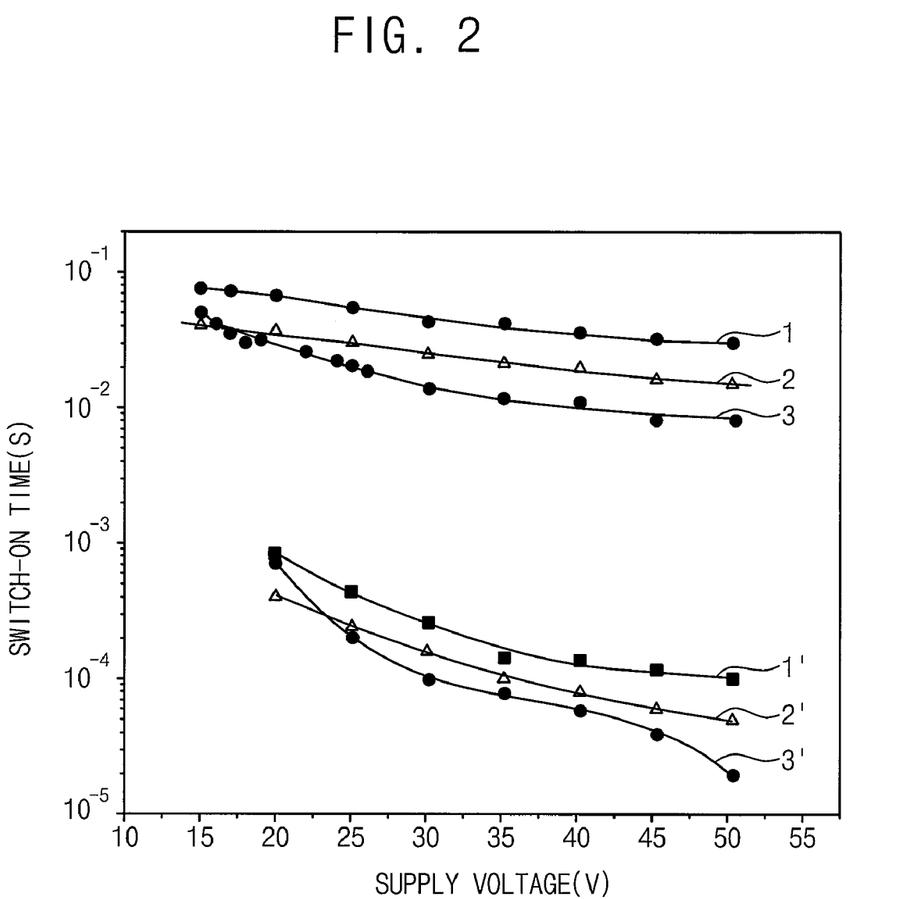
FIG. 2 illustrates the dependence of the switch-on time on the amplitude of the supply voltage pulse of the LC-systems with complexes based on different organic donors.

The dependence of the time-on on the amplitude of the supply voltage pulse for the NLC with different exemplary organic donors is shown in FIG. 2, for LC systems with complexes based on photosensitive components with initial charge transfer. In FIG. 2, the initial characteristics are shown in (1-3), while the characteristics after self-arrangement are shown in (1'-3'). (1, 1') show the relationship for polyimide (PI)-$C_{70}$, (2, 2') show the relationship for polyaniline (PANI)-$C_{60}$, while (3, 3') show the relationship for 2-cyclooctylamine-5-nitropyridine (COANP)-$C_{70}$. Thus, one can see that the NLC switching time obtained in accordance with embodiments of the current invention is comparable to the speed of smectic liquid crystals.

An NLC composition such as those described above may be positioned between substrates of an LC device. For example, to obtain an LC device in accordance with embodiments of the invention, NLC materials should be sensitized with the charge transfer fullerene-containing complex, then the resulting composition should be placed between two glass substrates coated with one or more transparent conducting contacts. An electromagnetic signal, such as a rectangular pulse supply voltage should be used to drive the sensitized LC cell. A visible range laser or white diode beam can be used to investigate the temporal and modulation characteristics of a fullerene-containing nematic LC cell.

Some exemplary systems have been investigated, and illustrate the benefits that may be obtained with fullerene-containing complexes, according to embodiments of the current invention.

An exemplary system in accordance with the current disclosure comprises a nematic LC cell with thickness of 10-15 μm has been investigated. A rectangular pulse supply voltage with the amplitude of 10-60 V was applied at a repetition frequency of 0.5-1500 Hz, with a pulsewidth of 1-90 ms. A CW He-Ne-laser with a wavelength of 630 nm (or white diode irradiation) can be used to study the temporal and modulation characteristics of new fullerene-containing nematic LC structures. As noted above, time-on parameters of the electro-optical response for fullerene-containing LC cells with different electro-optical donor-acceptor complexes are shown in FIG. 2.

Figure 3:
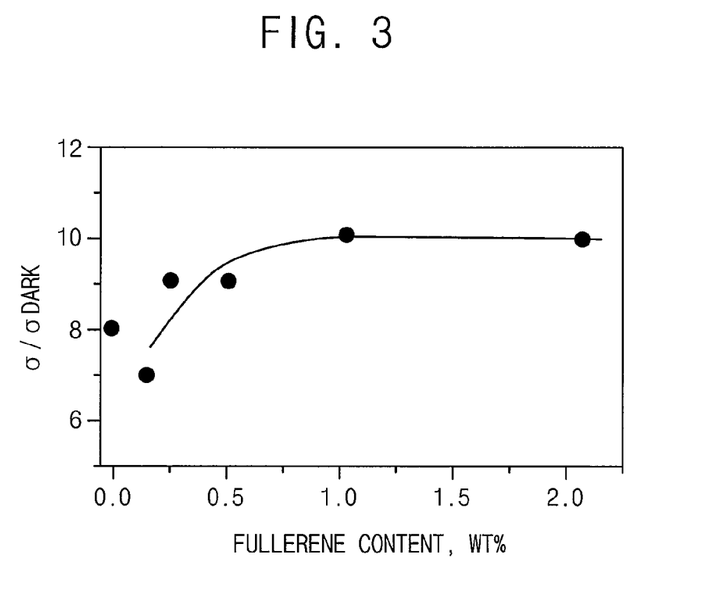
FIG. 3 illustrates the dependence of the relation between photo- and dark conductivity of an organic donor-acceptor system based on polyimide on fullerene content.

Conductivity measurements for systems with a fullerene-containing complex based on polyimide-$C_{70}$ have been made. FIG. 3 shows the ratio of photo- to dark conductivity of the organic donor-acceptor system based on polyimide-$C_{70}$ as a function of fullerene content (in wt. %). The saturation level is close to fullerene content of 0.5 wt %. This dependence of the change in photoconductivity with fullerene content can be considered as evidence of the donor-acceptor interaction. A person of skill in the art understands that the charge transfer complex influences the switching structure characteristics. Thus, it is not necessary to increase the fullerene content in the LC mesophase in order to improve the switching characteristics beyond the level at which saturation has been reached.

Table 1 presents data illustrating the dependence of temporal characteristics and contrast on increasing fullerene content or fullerene-containing complex, for a system based on donor-acceptor structure of polyaniline-$C_{60}$.

Based on the data presented in Table 1, one can see that tolerable temporal and contrast parameters can be obtained with the introduction of sensitizer at a level of about 0.5 wt. %. The contrast decreases drastically when the concentration range is increased substantially, as mentioned above. Thus, the contrast and switching speeds shown in Table 1 as a function of increased content of fullerene-containing complex illustrate that the indicated concentration levels provide an optimal compromise between switching parameters and the contrast of the system.

TABLE 1

Switching parameters and contrast of nematic LC-cells based on NLC with polyaniline-$C_{60}$ complex

| Structure | Fullerene content, wt. % | Time-on, microseconds | Time-off, microseconds | Contrast, a.u. |
|---|---|---|---|---|
| NLC + Polyaniline-$C_{60}$ | 0.1 | 250 | 420 | 87 |
| | 0.5 | 200 | 380 | 79 |
| | 1 | 170 | 300 | 59 |

The dependence of switching parameters on fullerene content has been obtained for a system based on a NLC+polyaniline-$C_{60}$ complex. The data are presented in FIG. 4.

Figure 4:
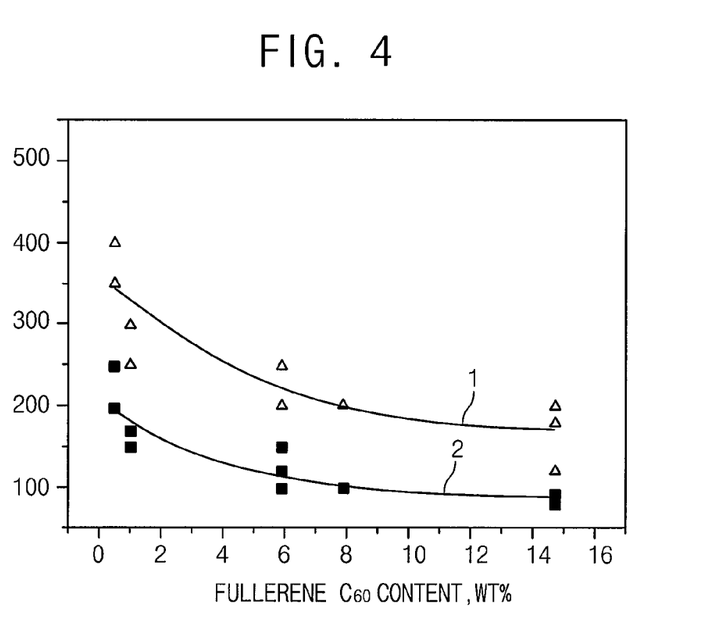
FIG. 4 illustrates the dependence of the switching time on the fullerene content of the structure based on donor-acceptor systems: polyaniline-$C_{60}$.

One can see from this FIG. 4, that there are no essential switching parameters changing with fullerene content increasing up to 0.5 wt. %. Moreover, the contrast decreases drastically after exceeding this content level. The data of Table 1 confirm this observation.

INDUSTRY APPLICATION

Due to easy control of fullerene-containing LC-systems, these systems may be beneficially applied in industry. Standard methods of electric and light field control have been used to demonstrate the ease of control. Additionally, traditional nematic LC-materials and compositions, such as 5CB (E. Merck) or E7 (BDH) may be used to implement the systems and techniques described herein (although other nematic LC materials may be used). It is noted that nematic liquid crystal materials are typically lower priced than the smectic LC-compositions. Moreover, in general, nematic compositions include fewer components than smectic compositions. Finally, nematic compositions operate under both laser irradiation and under broad spectral irradiation using (for example) a white diode. Moreover, the size of sensitizer particles and the thickness of the cell are relatively small.

What is claimed is:

1. A liquid crystal composition comprising:
    a nematic liquid crystal material; and
    a fullerene-containing complex comprising an organic molecule having a donor part and a fullerene, and
    wherein the fullerene-containing complex is less than 0.5 wt. % of the liquid crystal composition.

2. The liquid crystal composition of claim 1, wherein fullerene-containing complex comprises an organic donor part of at least one of a monomer molecule and a polymer organic molecule.

3. The liquid crystal composition of claim 1, wherein the organic donor part is a part of a polymer organic electro-optical molecule, and wherein the fullerene-containing complex is in the range of 0.1-0.5 wt. % of the liquid crystal composition.

4. The liquid crystal composition of claim 1, wherein an electron affinity energy of the fullerene in the fullerene-containing complex is larger than an electron affinity energy of an acceptor part of the organic molecule.

5. The liquid crystal composition of claim 1, wherein an electron affinity energy of fullerene in said fullerene-liquid crystal complex is close to 2.65 eV.

6. The liquid crystal composition of claim 1, wherein liquid crystal material comprises liquid crystals with positive optical and dielectric anisotropy.

7. A liquid crystal device comprising:
    a first substrate including at least a first electrode;
    a second substrate including at least a second electrode, wherein the first electrode and the second electrode are positioned to generate an electric response of a liquid crystal composition positioned between the first substrate and the second substrate; and
    the liquid crystal composition positioned between the first substrate and the second substrate, wherein the liquid crystal composition comprises:
        a nematic liquid crystal material; and
        a fullerene-containing complex comprising an organic molecule having an organic donor part and further comprising a fullerene, wherein the fullerene-containing complex is less than 0.5 wt. % of the liquid crystal composition.

8. The device of claim 7, wherein fullerene-containing complex comprises an organic donor part of at least one of a monomer molecule and a polymer organic molecule.

9. The device of claim 7, wherein the organic donor part is a part of a polymer organic electro-optical molecule, and wherein the fullerene-containing complex is in the range of 0.1-0.5 wt. % of the liquid crystal composition.

10. The device of claim 7, wherein an electron affinity energy of the fullerene in the fullerene-containing complex is larger than an electron affinity energy of an acceptor part of the organic molecule.

11. The device of claim 7, wherein electron affinity energy of fullerene in the fullerene-containing complex is about equal to 2.65 eV.

12. The device of claim 7, wherein liquid crystal material comprises liquid crystals with positive optical and dielectric anisotropy.

* * * * *